3,005,734
LATEX MANUFACTURE

Pritchard P. Ellis, Baytown, Tex., assignor to United Rubber and Chemical Company, Houston, Tex., a corporation of Delaware
No Drawing. Filed Aug. 10, 1959, Ser. No. 832,475
7 Claims. (Cl. 134—22)

This invention relates to synthetic rubber latices. More particularly, it relates to an improvement in a process for preparing synthetic rubber latices. Still more particularly, it relates to a cleaning treatment of equipment employed in the preparation of such latices.

Synthetic rubber latices are prepared, in general, by the emulsion polymerization of a butadiene-1,3 or mixtures thereof, or by the copolymerization of a butadiene-1,3 with other compounds polymerizable therewith. This well-known reaction is conducted in an aqueous medium in the presence of a surfactant and an activator, the reaction being shortstopped at the desired point, after which the resultant polymer or copolymer is separated and subjected to washing, filtering and drying operations. The reaction vessels employed for the polymerization reaction are conventional vessels equipped when necessary with cooling means and capable of withstanding superatmospheric pressure. Extensive use of such reaction vessels, whether in a batch or continuous manner, is usually accompanied by a gradual buildup of a hard and extremely adherent coating or deposit on their inner surfaces. The exact nature of this coating or deposit is indefinite, although it probably comprises the polymer or copolymer as well as the monomer, soap, activator and materials of unknown composition. For the purpose of this invention, however, such deposit will be referred to generally merely as "polymerization material." Deposits of this nature are particularly troublesome in the preparation of cold or low temperature rubber by emulsion polymerization which requires a cooling system associated with each reaction vessel because of the exothermic nature of the reaction. Over a period of time, the deposit becomes so dense upon the surfaces of the cooling system as to greatly impair the effectiveness thereof.

Because of the buildup of polymerization material on all exposed surfaces of the reactor, including the cooling system, it is necessary to periodically shut down each reactor and subject it to a cleaning operation. Heretofore, polymerization material has been removed from reaction vessel surfaces by various means as by hand chipping, the disadvantages of which are obvious. Not only is it inefficient and uneconomical but, more important, it is dangerous. It has also been proposed to remove such polymerization material by chemical treatment as by the use of a mixture of a hydrocarbon solvent such as Varsol and an organic peroxide such as cumene hydroperoxide. Such treatment is effective in removing the deposit but is subject to other disadvantages. Among these may be mentioned the fact that there is no practical way of recovering the solvent which renders the treatment inefficient and uneconomical because the solvent must be disposed of after only limited reuse. Disposal of the deposit-bearing solvent, moreover, constitutes a problem since it cannot be disposed of in the normal plant effluent.

There has remained, therefore, a demand for an improved process for removing deposits of polymerization material from those surfaces of polymerization reactors, including cooling systems associated therewith, exposed to a polymerization reaction. It is a principal object of this invention, therefore, to provide such a process. It is a further object of this invention to provide a chemical process which will effectively remove deposits of polymerization material from such surfaces. It is a still further object of this invention to provide such a process which is not only effective in removing such deposits but which is also economical and safe. A still further object of this invention is to provide a process which does not require a recovery system to render it economical. An additional object is to provide a process in which the plant effluent system may be used directly for waste disposal.

These objects have been met in a relatively simple yet surprisingly effective manner. In general, the process of this invention comprises treating a reaction vessel bearing deposits of polymerization material, such as that formed in the preparation of synthetic latices, with an aqueous solution of a water soluble soap referred to herein as a treating agent. Such treatment results in the polymerization material being put into solution and/or suspension. After the surfaces have been cleaned to the desired extent, the deposit-bearing liquor is withdrawn from the reaction vessel and the latter washed with water rendering it suitable for further use. Both treating solution and wash water are disposed of with the regular plant effluent.

While the process is simply described above, nevertheless there are certain preferred conditions which should be observed to obtain optimum results. These conditions will be further discussed below.

As previously stated, the process of this invention is concerned with polymerization material formed on equipment surfaces, particularly reaction vessels and cooling systems associated therewith during the preparation of synthetic latices. By the latter is meant those latices formed by the polymerization of a butadiene-1,3 such as butadiene-1,3, methyl-2-butadiene-1,3, chloro-2-butadiene-1,3, piperylene-2,3-dimethyl butadiene-1,3 and the like as well as mixtures thereof. Also intended to be included are those latices formed by the polymerization of butadiene-1,3 with one or more compounds polymerizable therewith containing a terminal $CH_2=C<$ group. Examples of such compounds are aryl olefins such as styrene, vinyl naphthylene, alpha-methylstyrene, para-chlorostyrene and the like; and the alpha methylene carboxylic acids, their esters, nitriles and amides such as acrylic acid, methyl acrylate, methyl methacrylate, acrylonitrile, methacrylonitrile, methacrylamide, isobutylene, methyl vinyl ether, methyl vinyl ketone, vinylidene chloride and the like.

The treating agent employed in the process of this invention is, as described above, a water soluble soap or mixtures thereof. By water soluble soap as employed herein is meant a water soluble salt of a monocarboxylic acid such as caprylic, lauric, myristic, palmitic, stearic, oleic and the like; salts of rosin acids including hydrogenated, dehydrogenated and disproportionated rosin acids such as abietic acid, dehydroabietic acid, and the like; and mixtures of water soluble salts of such acids as might be derived, for example, from tall oil. By water soluble salt as employed herein is meant ammonium as well as alkali metal salts.

It is apparent from the above description of treating agents that certain of these have also exhibited usefulness as emulsifiers in the polymerization reactions from which result the very deposits of polymerization material attempted here to be treated by the present invention. The effectiveness of the present invention, therefore, is particularly surprising and completely unexpected since not only may a deposit be removed by use of an aqueous solution of a treating agent, which agent may also have been present as an emulsifier during the formation of the deposit, but the presence of the agent during polymerization in amounts greater than that necessary for emulsifying has not shown to substantially effect the formation of the deposit. The manner in which the process of this invention functions, therefore, is not clearly understood although it appears to involve, at least to some extent, a solubility reaction. Nevertheless, it is not an intention to restrict this invention by any particular theory of operation.

The treating agent or water soluble soap, as previously stated, is employed as an aqeuous solution. The concentration of treating agent in this solution will naturally be governed to some extent by the polymerization system involved, the particular treating agent employed as well as the extent of the deposition comprising polymerization material. The concentration employed in any particular case may be readily determined by one skilled in the art. In general, however, it can be stated that some cleaning effect of surfaces bearing such deposits is obtained when using a concentration as low as 0.15% by weight. Better cleaning action can, of course, be attained by using greater concentrations of soap solution. However, beyond about 1.00% concentration the added advantage gained by further increase in concentration does not appear to be warranted. In general, other conditions being optimum, an aqueous solution of a treating agent of about 0.30% to about 0.50% will usually provide satisfactory results.

It has been found particularly desirable according to the process of this invention to conduct the cleaning operation under mildly basic conditions. For this purpose, the aqueous solution of treating agent, if not already so, is adjusted to and maintained at a hydrogen ion concentration equivalent to that of a pH slightly greater than 7, preferably from about 7-9. If adjustment is necessary it may readily be obtained by conventional means as by the use of sodium hydroxide or the like.

It has also been found desirable to conduct the reaction at an elevated temperature since the cleaning reaction appears to be influenced to some extent by heat. While the reaction will proceed at normal room temperatures, as a practical matter, it is generally too slow. As the temeprature increases, however, an increase in reaction rate is observed. It has been found preferable, therefore, to conduct the reaction at a temperature of at last about 100° F., and even as high as about 200° F. No particular added advantage appears to be gained, however, by operating beyond about 200° F. As a practical matter, the preferred temperature range is about 125-175° F. which may be readily maintained by any means as by circulation of the treating solution through an external heat exchanger.

The cleaning reaction is preferably conducted with constant agitation, the means for which may take any form. For this purpose, the same agitation means may be employed as for the polymerization reaction previously conducted in the vessel being cleaned. The cleaning reaction is usually completed in from about 48-96 hours depending upon the polymerization system, treating agent and the like. On completion of the cleaning reaction, the solution is withdrawn and the vessel washed with water. On withdrawal of the wash water and disposal thereof in the plant effluent along with the deposit-bearing liquor the reaction vessel is again ready for latex production.

The process of this invention is further described by the following examples. These examples are intended to be illustrative only and not by way of limitation. Unless otherwise indicated all parts are by weight.

*Example 1*

A reaction vessel bearing a heavy deposit of polymerization material resulting from the emulsion polymerization of butadiene-1,3 and styrene is filled with 28,000 parts of water containing 100 parts of Dresinate TX (a sodium salt of a rosin acid) and adjusted to a pH of 8.0 with a 20% solution of sodium hydroxide. The solution is heated to a temperature of 175° F. by circulationtion through an external heat exchanger. A temperature of about 175° F. is maintained and the solution constantly agitated for about 60 hours after which agitation and circulation are stopped and the solution withdrawn. The reaction vessel is then washed with water and the water and deposit-bearing liquor disposed of with the regular plant effluent. Substantially all polymerization material is removed from the vessel which is again ready for its normal use in the preparation of latex.

*Example 2*

The procedure of Example 1 is repeated replacing the rosin acid salt with an equivalent amount of sodium stearate. Similar results are obtained.

*Example 3*

The procedure of Example 1 is repeated except that the reaction vessel treated is one employed in the emulsion polymerization of butadiene-1,3 to polybutadiene. Substantially complete removal of polymerization material is obtained.

Similar results are obtained in the treatment of vessels bearing deposits formed in the preparation of other synthetic latices by using other treating agents in concentrations and temperatures and at pH's dictated by the particular situation.

The term "reaction vessel" as employed herein is intended to means not only the reaction vessel itself but all equipment allied therewith, such as cooling systems, on the surfaces of which polymerization material may form during the polymerization reaction.

I claim:

1. A process for removing from the surfaces of reaction vessels a hard and adherent deposit of polymerization material formed during the emulsion polymerization of a member selected from the group consisting of a butadiene-1,3 and a butadiene-1,3 with at least one compound containing a terminal $CH_2=C<$ group and polymerizable therewith which comprises: subjecting such surfaces to the action of an aqueous solution consisting of a water soluble soap.

2. A process according to claim 1 in which the water soluble soap is a salt of a member selected from the group consisting of monocarboxylic acids and rosin acids.

3. A process according to claim 2 in which the salt is an alkali metal salt.

4. A process according to claim 2 in which the water soluble soap is an alkali metal salt of a monocarboxylic acid.

5. A process according to claim 2 in which the water soluble soap is an alkali metal salt of a rosin acid.

6. A process according to claim 1 in which the solution is alkaline.

7. A process according to claim 1 in which the temperature of the aqueous solution is greater than about 100° F.

References Cited in the file of this patent

UNITED STATES PATENTS 2,810,665    Szayna _____ Oct. 22, 1957

OTHER REFERENCES

Schwartz & Perry: "Surface Active Agents," page 27, Interscience Publishers, Inc., New York, 1949.